Jan. 5, 1926.  J. CHRISTIE  1,568,656

CAMERA BELLOWS CONSTRUCTION

Filed March 12, 1925

John Christie,
INVENTOR,

BY
ATTORNEYS.

Patented Jan. 5, 1926.

1,568,656

UNITED STATES PATENT OFFICE.

JOHN CHRISTIE, OF ROCHESTER, NEW YORK, ASSIGNOR TO EASTMAN KODAK COMPANY, OF ROCHESTER, NEW YORK, A CORPORATION OF NEW YORK.

CAMERA BELLOWS CONSTRUCTION.

Application filed March 12, 1925. Serial No. 14,919.

*To all whom it may concern:*

Be it known that I, JOHN CHRISTIE, a citizen of the United States of America, residing at Rochester, in the county of Monroe and State of New York, have invented certain new and useful Improvements in Camera Bellows Construction, of which the following is a full, clear, and exact specification.

This invention relates to photography, and more particularly to photographic camera construction. It has for its object to provide a simple arrangement of parts by which an air passage way is provided so that in rapidly drawing out or closing up the bellows the air may pass freely to or from the bellows. Another object of my invention is to provide air channels in the lens board through which air may pass to the bellows, and in which light rays will be excluded from the bellows. Another object is to provide a flanged retaining collar for the shutter having spaced therefrom a flanged bellows front plate so as to form a light excluding air passage therebetween. Another object is to provide an air vent of the type described which will not disfigure the camera, and other objects will appear from the following specification, the novel features being pointed out in the claims at the end thereof.

In the drawings wherein like reference characters denote like parts throughout

Figure 1:
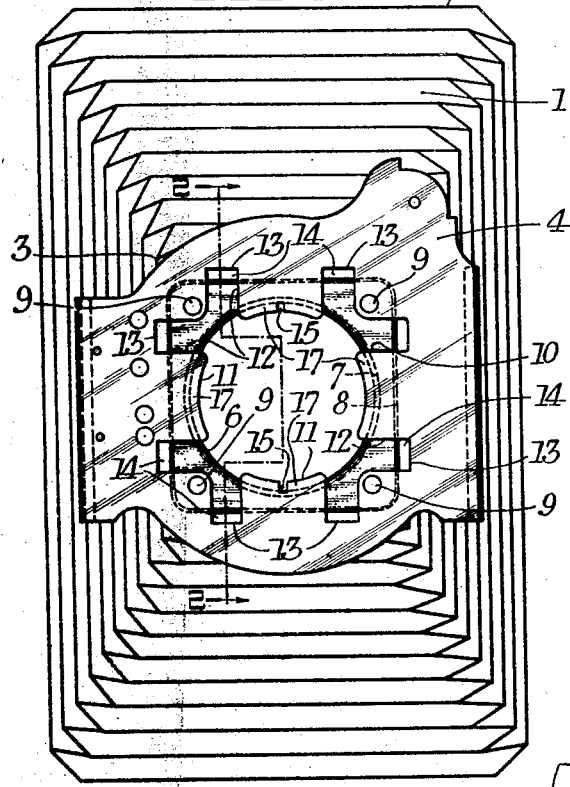
Fig. 1 is a front elevation of a camera bellows and lens board equipped with an air vent constructed in accordance with and illustrating one embodiment of my invention.

In Fig. 1, I have shown a typical camera bellows which has a relatively large end 2 which may be attached to a camera body in the usual manner and a relatively small end 3 which is supported upon the lens board 4. In order to prevent the camera bellows from collapsing or from becoming extended when the camera is being opened and closed, I have provided a light trapped air vent between the small end 3 of the camera bellows and the lens board 4 as will now be described.

The small end 3 of the bellows may be pasted or otherwise affixed to a bellows plate 5 which is centrally apertured at 6, there being a flange 7 extending rearwardly from the periphery of this aperture. The outside 8 of the plate is approximately the same dimension as the end of the bellows. This plate is attached by means of rivets 9 to the lens board 4 so that a small area 10 of the leather bellows lies between the bellows plate 5 and the lens board 4.

The lens board 4 is also centrally apertured at 11, the periphery of this aperture being slotted at 12 so as to form channels extending away from the aperture. The dimension of these channels is such that the ends 13 thereof extend beyond the edge 8 of the bellows plate 6, so that openings 14 are provided, through which air may freely pass from behind the lens board 4. If desired, notches 15 may be provided in the lens board for locating the camera shutter 16 in the proper position. Such locating slots are common practice.

Figure 2:
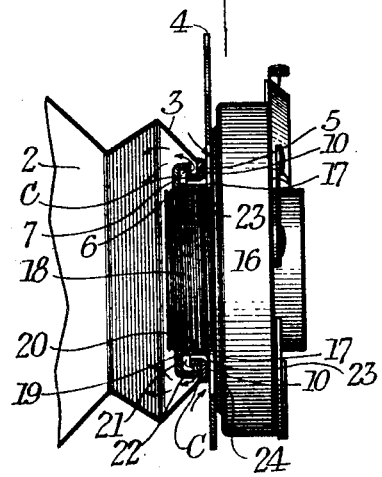
Fig. 2 is a detail fragmentary section on line 2—2 of Fig. 1 showing a camera shutter in elevation.
Figure 4:
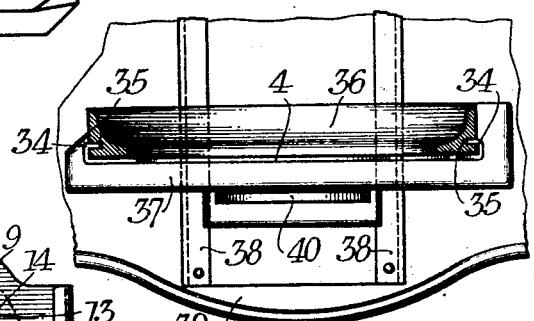
Fig. 4 is a top fragmentary view a portion of a camera bed showing the relation of the lens board to the lens board supporting structure.
Figure 3:
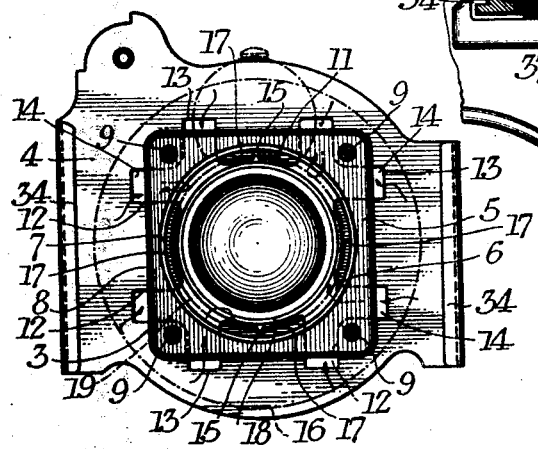
Fig. 3 is a rear elevation of the structure shown in Fig. 1, the bellows being illustrated in section.

The slots 12 provide in effect a series of lugs 17 spaced about the central aperture 11. These lugs 17 have their inner edges positioned so that a threaded lens tube 18 may be inserted between them. The shutter 16 is held in position upon the lens board 4 by means of a collar 19 which is threaded at 20 to screw on the tube 18 and which has an outwardly extending flange 21. This flange is bent over at the edge as indicated at 22. The inner edge 23 of the collar is adapted to rest against the lugs 17 when the parts are in assembled position as is shown in Fig. 2. The shutter is located by lugs 17, and collar 19, by contacting with lugs 17 holds the shutter on lens board 4. An air passage way between the rear face of the shutter 24 and a front of the bellows plate 10 is thus provided.

The lens board 4 is provided with inwardly turned flanges 34 which engage slots 35 in the yoke 36 which in turn is supported by the carriage 37 which may slide upon the rails 38 of the camera bed 39 in the usual manner. This carriage may have any desired form of latching mechanism 40 for holding the parts in the desired position.

As indicated in Fig. 2 when the parts above described have been assembled the slots 12 are entirely concealed by the shutter 16. Air may pass freely from behind the lens board through a tortuous channel indicated at C in Fig. 2, to and from the inside of the bellows. When the lens carriage 37 is moved back or forth on the tracks 38, the air by passing through the passage way prevents the bellows from becoming extended or collapsed.

While I have illustrated and described a preferred form of my invention, it is susceptible of different embodiments and I contemplate as within the scope of my invention all such modifications as may come within the scope of the appended claims.

Having thus described my invention, what I claim as new and desire to secure by Letters Patent is:

1. In a photographic camera having bellows and a shutter, the combination with an apertured bellows supporting plate, and an apertured lens board upon which the bellows supporting plate is carried, a plurality of lugs extending from the periphery of the lens board aperture for guiding and supporting the shutter, said lugs being spaced to provide a passage way for air through the two apertured members.

2. In a photographic camera having bellows and a shutter, the combination with an apertured bellows supporting plate, and an apertured lens board upon which the bellows supporting plate is carried, the lens board having a plurality of lugs formed by slots cut in the lens board extending away from the aperture, a collar for securing the shutter to the lens board, said collar being adapted to contact with the lugs when in position to hold the shutter on the lens board whereby air passageways between the lugs is provided.

3. In a photographic camera having a bellows and shutter, the combination with an apertured bellows plate, a lens board for supporting the bellows plate having an aperture the periphery of which is interrupted by slots, means for holding the shutter upon the plate, the dimensions of the bellows and bellows plate being less than that of the slots extending from the aperture of the lens board, whereby an air passage is provided between the shutter and the bellows plate.

4. In a photographic camera having a bellows and shutter, the combination with an apertured bellows plate, a lens board for supporting the belows plate having an aperture with slots extending therefrom, means for holding the shutter on the lens board, whereby an air passage through the lens board is provided, a wall of the shutter forming one wall of the air passage, the other wall being formed by the bellows plate.

5. In a photographic camera having a bellows and a shutter, the combination with a bellows plate and a lens board, the bellows plate being carried by the lens board, both of these members having apertures therein, the lens board aperture having slots extending therefrom, and a collar for holding the shutter upon the lens board, said collar being adapted to lie adjacent to but spaced from the bellows plate when in position to hold the shutter on the lens board, whereby an air passage is formed therebetween.

6. In a photographic camera having a bellows and a shutter, the combination with an apertured flanged bellows plate, an apertured lens board for supporting the bellows plate, a flanged collar adapted to secure the shutter to the lens board, the flanges on the bellows plate and the collar being adapted to form a tortuous air passage between them whereby air may pass freely therethrough and whereby light is excluded.

7. In a photographic camera having a bellows and a shutter, the combination with an apertured flanged bellows plate, an apertured lens board for supporting the bellows plate, a flanged collar adapted to secure the shutter to the lens board, said collar being adapted to engage parts of the lens board to hold the shutter thereon, the collar being spaced from the bellows plate so that the two flanges lie close one to the other whereby a light tight air passage is provided between the flanges.

8. In a photographic camera having a bellows, the combination with a lens board, of means for holding one edge of the bellows against the lens board, a shutter adapted to be supported by the lens board and a retaining collar for holding the shutter against the lens board, the retaining collar having a flange dapted to cooperate with the means for holding the bellows against the lens board to form an air passageway therebetween.

9. In a photographic camera, the combination with a bellows, of a slotted lens board attached to one end of the bellows, and a shutter supported by the lens board, said slotted lens board permitting air to pass between the shutter and the bellows.

10. In a photographic camera having a bellows, the combination with a slotted lens board adapted to support one end of the bellows, said slots in the lens board extending beyond an edge of the bellows attached to the lens board, whereby air may pass freely through the slots.

11. In a photographic camera having a bellows, the combination with a lens board adapted to support one end of the bellows, of an apertured bellows frame attached to the lens board to support the bellows therebetween, said lens board having a plurality of slots extending across the bellows frame permitting air to pass around the end of the bellows.

12. In a photographic camera having a bellows, a bellows support comprising a pair of apertured plates attached together with an edge of the bellows between the plates, one plate having lugs extending into the aperture, a shutter having a threaded member thereon, and a shutter retaining collar, said collar adapted to support the shutter by screwing on the threaded member of the shutter, said collar contacting with the lugs whereby air passage ways between the lugs are formed by the assembled parts.

Signed at Rochester, New York, this 7th day of March, 1925.

JOHN CHRISTIE.